(12) United States Patent
Lu et al.

(10) Patent No.: US 12,498,856 B2
(45) Date of Patent: Dec. 16, 2025

(54) DRAM ROW COPY

(71) Applicant: Micron Technology, Inc., Boise, ID (US)

(72) Inventors: Yang Lu, Boise, ID (US); Yuan He, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 220 days.

(21) Appl. No.: 17/940,789

(22) Filed: Sep. 8, 2022

(65) Prior Publication Data

US 2023/0236731 A1 Jul. 27, 2023

Related U.S. Application Data

(60) Provisional application No. 63/302,048, filed on Jan. 22, 2022.

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

2013/0254475 A1* 9/2013 Perego ............. G11C 11/40603
 711/106
2023/0033998 A1* 2/2023 Lin ..................... G06F 12/0804

* cited by examiner

*Primary Examiner* — Baboucarr Faal
(74) *Attorney, Agent, or Firm* — Wood IP, LLC; Theodore A. Wood

(57) ABSTRACT

A dynamic random access memory employs either or both of a normal row copy operation or a fast row copy operation to copy selected data from a first row of memory to a second row of memory, without transferring the data to an intermediary processor such as a central processing unit or a memory controller. Both operations depend on a concurrent electrical activation of two separate wordlines within a bank of a DRAM. For the fast row copy operation, the two separate wordlines are part of a shared section of a DRAM bank, having shared bitlines. Bit values are copied directly in parallel via common bitlines. For the normal row copy operation, the two separate wordlines are part of a common bank but not a shared section. Bit values are copied in serial via a general input/output bus within the bank.

20 Claims, 10 Drawing Sheets

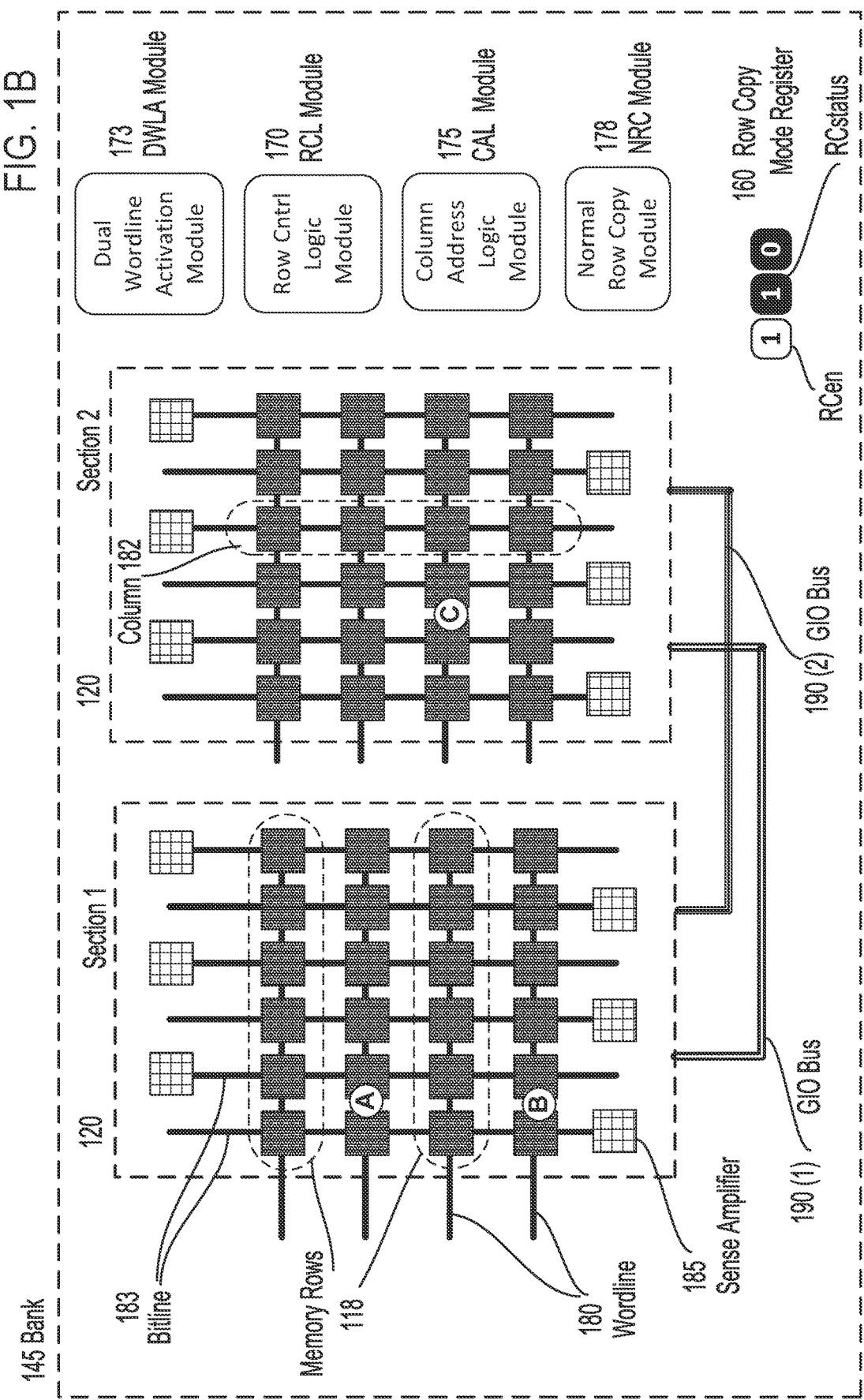

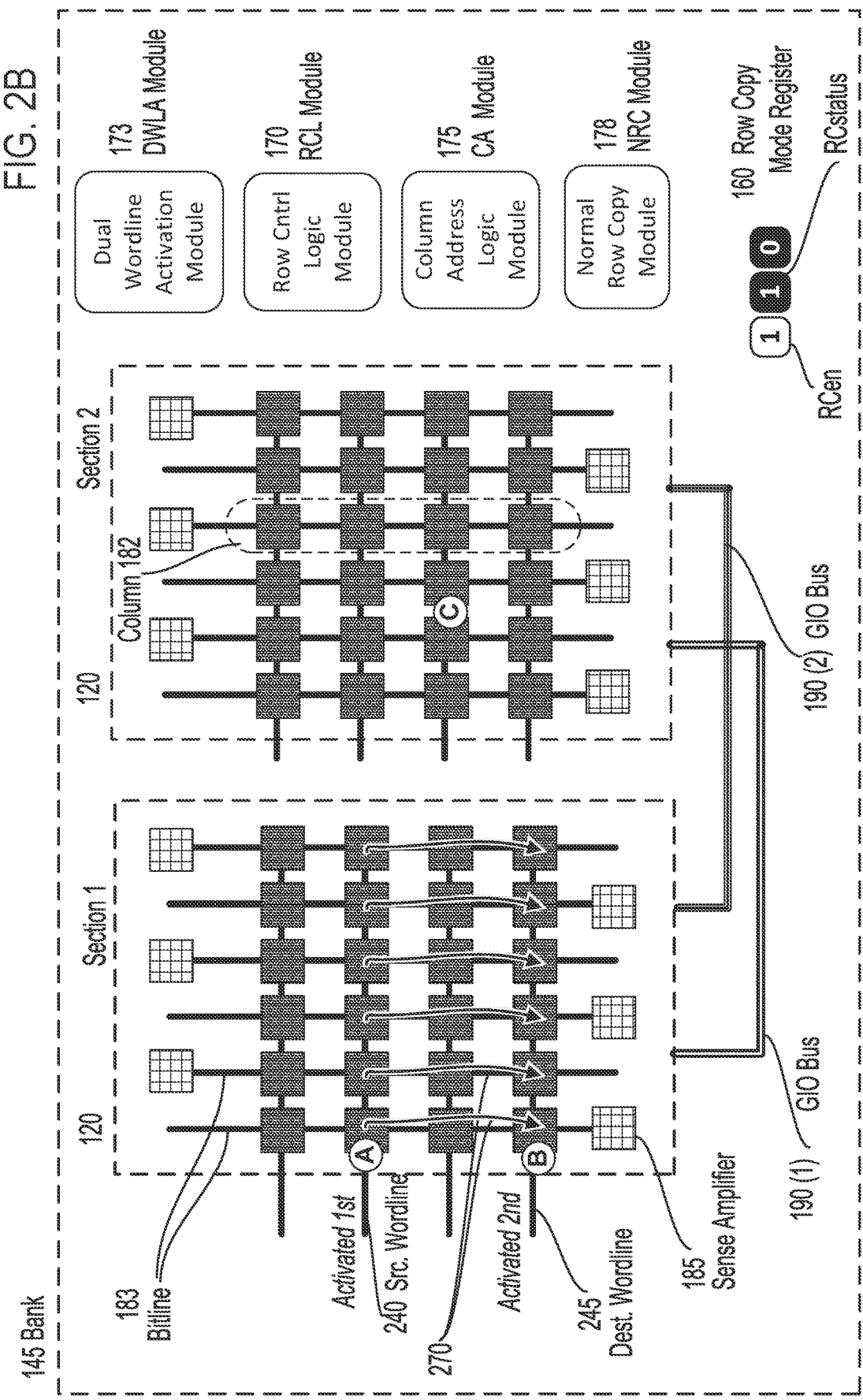

| MR | Value | Description |
|---|---|---|
| RCen | 0 | RC mode Disable |
| | 1 | RC mode Enable |
| RCstatus [1:0] | 00 | Last RC is done or DRAM just entered RC mode |
| | 01 | Fast RC is ongoing |
| | 10 | Normal RC is ongoing |
| | 11 | Can't perform RC |

Table 1

FIG. 7

DRAM ROW COPY

CROSS REFERENCE TO RELATED APPLICATIONS

This application claims benefit to U.S. Provisional Application No. 63/302,048 filed Jan. 22, 2022, and entitled "Compute Express Link (CXL) Dynamic Random-Access Memory (DRAM) Row Copy Feature," the disclosure of which is incorporated herein in its entirety by reference. Additionally, this application is related to the following commonly assigned U.S. Patent Applications: U.S. Pat. No. 11,994,990 B2 issued May 28, 2024, entitled "Memory Media Row Activation-Biased Caching;" U.S. Pat. No. 12,248,567 issued March 11, 2025, entitled "Row Hammer Interrupts to the Operating System;" U.S. Pat. No. 12,119,043 issued Oct. 13, 2024, entitled "Practical and Efficient Row HammerError Detection;" U.S. Pat. No. 12,182,413 B2 issued December 31, 2024, entitled "Area-OptimizedRow Hammer Mitigation;" U.S. Non-Provisional Application No. 17/941,655 filed Sep. 9, 2002, entitled "Aliased Row Hammer Detector;" U.S. Pat. No. 12,086,459 B2 issued Sep. 10, 2024, entitled "Optimized Control of the Commands Running in a Cache;" U.S. Pat. No., 11,977,769 B2 issued May 7, 2024, entitled "Control of the Back Pressure Based on a Total Number of Buffered Read and Write Entries," and U.S. Non-Provisional Application No. 17/903,493 filed Sep. 6, 2022, entitled "Arbitration Policy to Prioritize Read Command Dequeing by Delaying Write Command Dequeing," the contents of each of which is hereby incorporated by reference.

TECHNICAL FIELD

The present disclosure relates generally to one or more systems for memory. The present disclosure relates more particularly to copying data internally within a dynamic random access memory (DRAM).

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Application specific integrated circuits (ASICs) may be designed and used for many different purposes in computers, cell phones, and other digital systems and control systems. For example, an ASIC may regulate access to dynamic random-access memory (DRAM) by a computer's central processing unit (CPU) or by a cell phone's microprocessor. As a second example, a first flash memory controller ASIC may regulate the read and write operations to flash memory, such as may be used in solid state drives.

A computer, cell phone, or other digital/control system may issue multiple service requests to an ASIC, including for example, memory read/write requests, service interrupts, or other forms of service requests to the ASIC (e.g., interrupt-driven requests for ASIC input/output (I/O) activities).

In conventional DRAM, there is often a need to copy data from a first memory location to a second memory location. In legacy systems, this copying process may entail reading the data from the DRAM via the host microprocessor, then writing the data to a new memory location via the microprocessor or via a host memory controller. There is a need for more efficient data transfer within DRAM, to copy or move data within the DRAM without requiring the use of a host microprocessor or host memory controller as an intermediary component in the process.

BRIEF DESCRIPTION OF THE DRAWINGS

Advantageous designs of embodiments of the present disclosure result from independent and dependent claims, the description, and the drawings. In the following, preferred examples of embodiments of the disclosure are explained in detail with the aid of the attached drawings. The drawings, which are incorporated herein and form part of the specification, illustrate the present disclosure and, together with the description, further serve to explain the principles of the disclosure and to enable a person skilled in the relevant art(s) to make and use the disclosure.

FIG. 1B presents a schematic view of an exemplary memory bank which may be part of an exemplary DRAM module.

FIG. 2B presents a schematic view of an exemplary memory bank which may be part of an exemplary DRAM module showing data transfer flow indications.

FIG. 7 presents a table which lists exemplary row copy modes and row copy statuses.

Figure 1A:
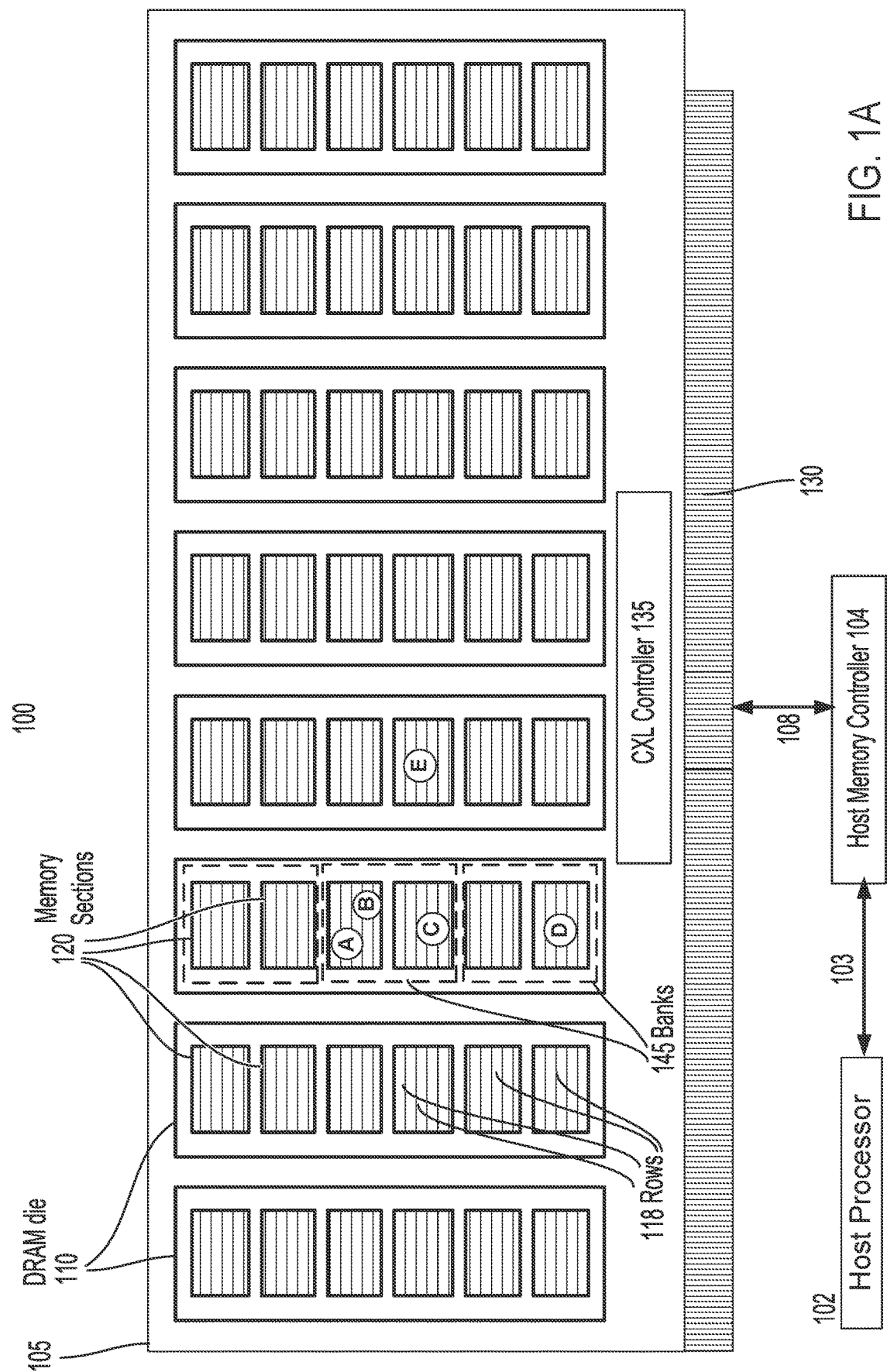
FIG. 1A illustrates an exemplary DRAM module according to the present embodiments.

In this document, illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

When a computer system perform memory actions (such as memory copy, object creating, memory remap, and soft post-package repair (SPPR) for row repair), the computer system usually needs to first initiate a data backup operation to move a row's data to a different row within a same DRAM die 110.

In current systems with DRAM, and with reference to FIG. 1, a host processor 102 and/or a memory controller 104 needs to read out a source row {A} and then write it to a destination row such as either of rows {B} or {C}, creating a temporary copy of the data as an in-between stage in the process. The whole operation will have at least two active stages, two precharge states, and a series of read and write stages (for example, 64 stages, depending on row size) for a row-to-row data copy.

During the legacy copy operation, a system data bus 103 and a command bus 108 between the memory controller 104 and the DRAM dies 110 will be busy during the operations mentioned above. A typical minimum time to complete this operation is on the order of 500 nanoseconds (ns) (DDR4-3200, 1K column addressing).

A DRAM module 100 is usually operated based on a system channel. For example, a CXL module is operated on a CXL channel which is 80 bits. Even if a computer system only wants to copy data on one of the DRAM dies 110, (e.g., a data copy for SPPR repair), those operations will happen on all dram dies 110 with a shared, same system channel/rank. This usually includes ten-or-more dies, though only eight are shown in FIG. 1.

The present embodiments significantly ameliorate these delays for some row copy operations, as discussed further below. The DRAM dies 110 have multiple banks 145. Each bank has multiple memory sections 120, with each of the sections 120 having multiple data rows 118. The present embodiments entail a row copy (RC) operation to achieve row copy within the data rows 118 of one of the banks 145 inside of any one of the DRAM dies 110. The exemplary row copy operations are performed with no need for a data transfer between the memory controller 104 and the one DRAM die 110.

The RC operation of the present embodiments copies the source row (for example, {A}) directly to the destination row (for example, {B} or {C}) via hardware (gate/transistor level) based connections. The RC operation is only allowed within a certain range of row addresses. (The specific address range will be determined by product architecture.)

For purposes of the present embodiments and architecture, the source row (for example, {A}) and destination row (for example, {B} or {C}) are within a same one of the banks 145 due to the specific exemplary architecture illustrated herein. However, persons skilled in the art will recognize that the architecture could be extended to two different banks 145 within a one of the DRAM dies 110 (for example if an additional data bus within the one DRAM die was implemented for purposes of such transfer).

For convenience, and as labeled in FIGS. 1A and 1B (and other figures), the source row for a data copy operation will generally be labelled {A} (e.g., "source row {A}") and the destination row will be labelled {B} (e.g., "destination row {B}") or labelled {C}(for example, "destination row {C}"), as applicable.

A row copy operation from any of {A}, {B}, or {C} to row {D} would not be enabled, as row copy from a first of the banks 145 to a second one of the banks 145 is not provided for. However, with suitable additional hardware, row copy from any of {A}, {B}, or {C} to row {D} could be enabled (again, for example, with provision of an additional or extended DRAM die data bus not shown).

In the embodiments, a row copy operation from any of {A}, {B}, {C} or {D} to row {E} (FIG. 1A) would not be enabled; row {E} is on a separate DRAM die. Row copy from a first DRAM dies 110 to a second of the DRAM dies 110 is not provided for. However, in alternative embodiments, a suitable bus, or extension of an existing bus on the circuit board 105 may provide for such direct copying from {A}/{B}/{C}/{D} to {E}, with suitable control circuitry.

Two types of row copy operations are described within this document, "fast row copy" and "normal row copy" operation. Fast row copy only allows row copy within a common one of the sections 120. Normal row copy allows for copy in a common one of the banks 145 across different sections 120. The allowed row address range does not overlap between fast row copy and normal row copy.

As described in part above, FIG. 1A illustrates an exemplary DRAM module 100 according to the embodiments, which may be a CXL DRAM module. The exemplary DRAM module 100 may for example be suitable for installation in a PCIe slot (not shown in the figure) of a computer server or laptop computer. Multiple DRAM dies 110 may be mounted on a circuit board 105 and connected via the circuit board 105 to pins 130.

The pins 130 may form an electrical connection with a PCIe bus of the computer, thereby forming a digitally communicative connection with a host processor 102 of the computer via the host memory controller 104. The DRAM module 100 may also have a CXL controller 135 connecting to the DRAM dies 110 via a command bus (not shown in the figure). As will be appreciated by persons skilled in the relevant arts, each DRAM die 110 has multiple rows 118 of data storage, each row 118 having an assigned address.

By way of background, data may be copied from one DRAM chip to another, for example from row {A} of a first DRAM die to row {E} of any second DRAM die. However, such generic copy operations, referred to herein as simply a "copy operation", entails processing the copied data through at least one of the host processor 102, and/or the host memory controller 104.

In the embodiments, the copying of data which may be improved or made more efficient is the copying of row data within one of the DRAM dies 110 and is referred to herein as a direct RC operation or simply a RC operation.

FIG. 1B presents a schematic view of an exemplary memory bank 145. As can be seen in the figure, each of the banks 145 has an associated row copy mode register (RCMR) 160. The RCMR 160 has register bit(s) RCen for establishing control over row copy operations and register bits RCstatus for indicating the status of row copy operations.

Also shown in FIG. 1B, each of the banks 145 also has a dedicated row control logic module 170, referred to herein for brevity as the RCL module 170. The RCL module 170 has dedicated electronics to select memory rows 118 in the banks 145. The RCL module 170 also has the dedicated hardware and/or firmware logic to effectuate the RC operations, as described further below.

Each of the banks 145 has its own dedicated column address logic module 175, referred to herein for brevity as the CAL module 175. The CAL module 175 selects specific column bitlines 183.

Each of the banks 145 also has a dual wordline activation module (DWLA module) 173. In legacy DRAM dies 110, within each of the banks 145 only a single wordline 180 can be activated at one time. In the embodiments, two wordlines 180 can both be active at one time—both a source wordline 240 (see FIG. 2) for a source row {A}, and a destination wordline 245 (see again FIG. 2) for a destination row {B}. It is the simultaneous activation of two wordlines 180, for two different rows {A} and {B}, that contributes in part to the hardware level transfer of data from the source row {A} to the destination row {B} within each of the banks 145. In some embodiments, the DWLA module 173 may be part of the RC module 170.

The DWLA module 173 may identify the distance between the source row {A} and the destination row {B}. The DWLA module 173 may further identify, based on the distance, whether a fast RC operation, a normal RC operation, or no RC operation may be applied. In some embodiments, a module other than the DWLA module 173 may make these determinations.

Each of the banks 145 has at least one general input/output (GIO) bus 190 for data transfer. A common GIO bus 190 is communicatively coupled with multiple sections 120. In legacy systems, it is the GIO bus 190 that carries data bits (not shown in the figure) from bitlines/sense amplifiers 183/185 to the controllers 104/135; and then back again, from the controllers 104/135 to the bitlines/sense amplifiers 183/185. For a normal RC operation, the GIO bus 190 further copies data bits from a source row {A} or {B} in a first of the sections 120 to a destination row {C} in a second of the sections 120.

Figure 2A:
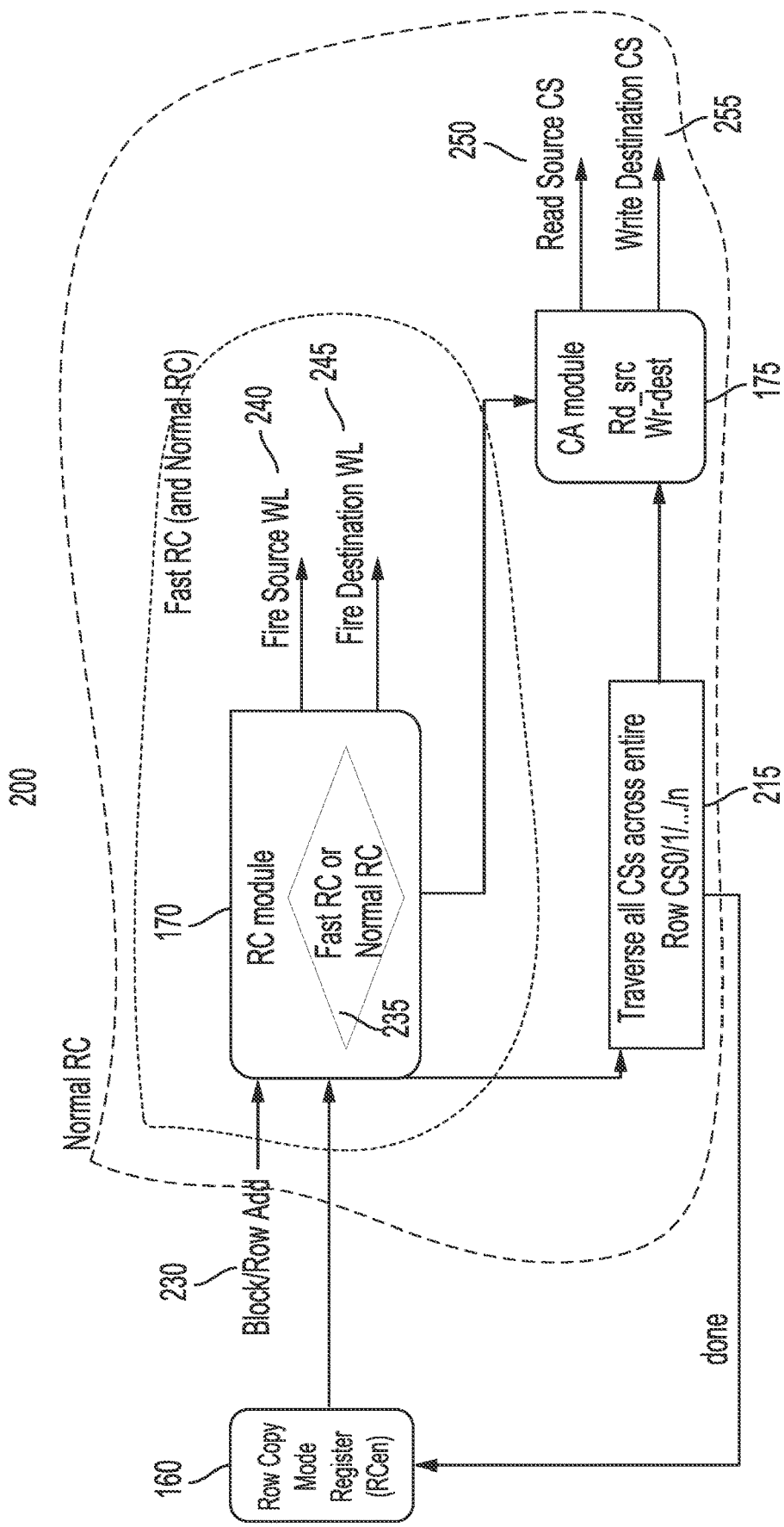
FIG. 2A is a process diagram illustrating exemplary elements of either a fast row copy operation or a normal row copy operation.

FIG. 2A and Table 1 of FIG. 7 together illustrate a row copy operational procedure and method according to the embodiments.

The term user, as used herein, refers to a software module, software driver, or application program, and/or hardware implementing the same. The user initiates an RC operation according to the embodiments. For one example, a user may be a software driver being executed by the host processor, and which causes the host processor to issue a request for a designated data from a first source memory address of the DRAM to be copied to a second destination memory address of the DRAM.

According to the embodiments, and as illustrated in FIG. 1B, each of the banks 145 may have a row copy mode register 160 with multiple bits. In FIG. 1B, mode register bit(s) used for setting a row copy mode are illustrated with black lettering on a white background; mode register bits used to indicate row copy status are illustrated with white lettering on a black background.

In the embodiments, a user enables the RC mode for a selected one of the banks 145 of a respective DRAM die 110 by setting a specific mode register bit RCen='1' for the selected one of the banks 145. Setting RCen='0' disables the RC mode for the selected one of the banks 145. In some embodiments, the user can only enter the RC mode when the selected bank is idle. Once in RC mode, the user may issue two successive DRAM activate (ACT) commands to indicate the source row and the destination row via suitable command parameters. For example, the source row may be {A} and the destination row may be {B}, resulting in the fast RC command being executed.

In another example, the source row could be either one of {A} or {B}, and the destination row could be {C}, resulting in the normal RC command being executed. The choices of source and destination rows, in relation to the rows illustrated, are arbitrary. For example, {B}/{A} could be the source/destination rows, or {C}/{A} or {C}/{B} could be the source/destination rows.

If the RC mode is active, upon issuance of the second ACT command for the destination row, the wordlines 180 of both the source row and the destination row are active simultaneously. In an exemplary instance, the first ACT command will arm the wordline 180 source row {A}. The second ACT will arm the wordline of the destination row {B}, provided that the source/destination rows {A}/{B} are within an allowed RC range of each other.

If rows {A}/{B} are beyond an allowed range, as determined by the hardware architecture, then the RC operation is not permitted. In some embodiments, the rows {A} and {B} must be in a common section 120 to initiate the fast RC operation. Here, if {A} and {B} are not in the common section 120, then both the rows {A} and {B} must still be in a common, shared bank 145 to initiate the normal RC operation.

In some embodiments, the choice between fast RC and normal RC may also depend on the size of the data to be copied. In some embodiments, the criteria for selecting between fast RC and normal RC may be hardwired into the logic of the RC operation on the DRAM die 110. In other embodiments, the logic for selecting the type of RC may be provided by firmware on one of the DRAM dies 110. In yet other embodiments, the user may be able to issue a command that indicates whether fast RC or normal RC is to be employed. DRAM hardware may then still over-ride the user setting if the user-selected choice (e.g., fast RC) cannot be performed.

The RCstatus bits will be updated to '01' or '10' depending on (a) the destination row and source row status and (b) whether they are within the fast copy range or normal copy range. Table 1 of FIG. 7 below illustrates exemplary RC statuses.

After the ACT command for the destination row for fast RC, the full RC process will automatically happen in one operation, as described below. It will finish the copy in a time tRC_fast: on the order of 100 ns in some embodiments. The RCstatus bits will be updated to "00" once copying is complete.

For normal RC, the DRAM die will go through the entire page internally and copy the data from the source row {A} to the destination row {B}, one bit at a time. This will require the longer time of tRC_normal, which could be on the order of 200 or more ns. RCstatus[1:0] will be updated to "00" once copying is complete.

Once initiated by the user, and whether employing the fast RC or normal RC, the RC operation is performed internally by the electronics of the selected DRAM die 110. Temporary data need not be first transferred to the memory controller 104 or to the host processor 102 during the operation since neither is required as an intermediary for the copy operation. Stated another way, the RC operation (fast or normal) is performed without requiring an intermediate transfer of the data to a host processor or memory controller external to the DRAM. This makes both fast and normal RC faster than legacy copy operations.

In some embodiments, once the RC operation is complete, the user will issue a pre-charge command to the selected one of the banks 145 that has the source row {A} and the destination row {B}. The RC mode register 160 can be used to check whether the RC operation is complete or not. Alternatively, if the user knows the RC operation has been initiated, the user can wait for tRC_fast time for the fast RC case or tRC_normal time for the normal RC mode before issuing the precharge command. In other embodiments, the post-row-copy pre-charge may be performed automatically by the selected DRAM die 110.

The exemplary non-limiting operations above are indicative of a method of using and controlling the RC operations. Some operations may be performed in a different order, and some may be added or omitted, within the scope of the appended claims. Other means and operations may be envisioned to initiate the RC operations of the embodiments.

FIG. 2A is a process diagram 200 illustrating exemplary elements of a fast RC operation or a normal RC operation.

In the embodiments, the RC module 170 receives from the user a block/row address 230. The block/row address 230 may include two addresses, both the source row {A} and the destination row {B}. The addresses may also indicate a particular data block (a series of bytes or bits) within the row. The RC module 170 may also ascertain, via the RC mode register 160, whether the RCen bit has been set to '1' to enable the RC operation.

The RC module 170 may also receive a copy type indication 235 of whether to perform the fast RC or the normal RC operation. For example, this copy type indication 235 may be received from logic in the RC mode register 160. Based on how close (e.g., within same section 120 or not) the source row {A} and the destination row {B} are, determination 235 as to whether to perform a fast RC operation or a normal RC operation is made by the RC module 170. Responsive to the block/row addresses 230 and the copy type indication 235, the RC module first activates the source wordline 240, and then activates the destination wordline 245 while the source wordline 240 remains active.

In the case of a fast RC, this dual-but-sequential wordline activation is sufficient to initiate the fast RC operation. The activation of the source wordline 240 causes the sense amplifiers 185 to detect the values of the bits in the source row {A}. The subsequent activation of the destination wordline 245 (while still maintaining the source wordline 240 as active) causes the bits in the destination row {B} to assume the values of the sense amplifiers 185. The result is the effective transfer of bit values from the source row {A} to the destination row {B}, as indicated by the exemplary data transfer flow indications 270 of FIG. 2B.

Figure 2C:
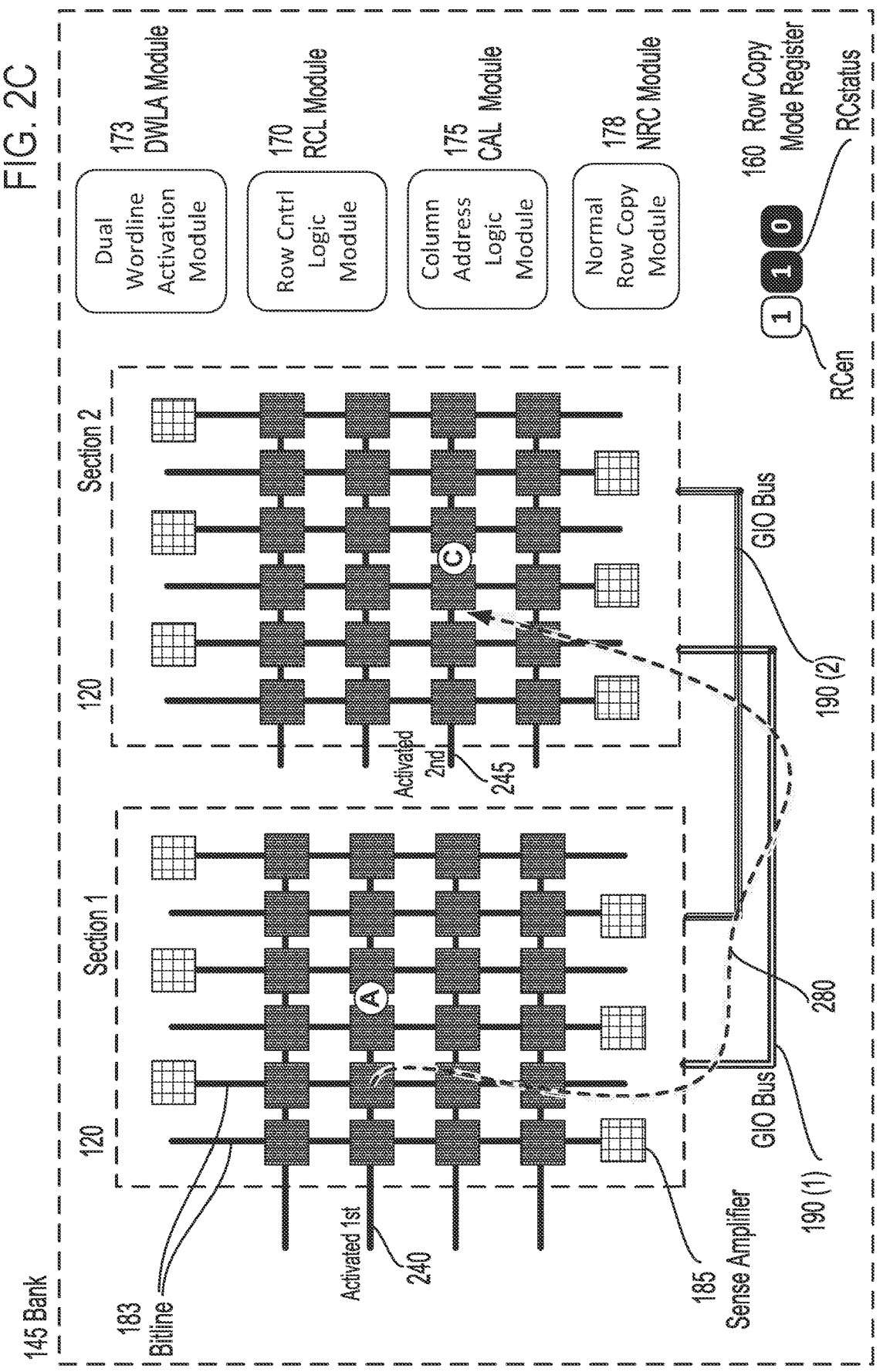
FIG. 2C presents the memory bank of FIG. 2B showing a data transfer path line.

In the case of a fast RC, the dual-but-sequential wordline activation is the first step in the normal RC operation. Referring to FIG. 2C, the source row may be row {A} of a first section 120, and the destination row may be a row {C} of a second, different section 120. For the normal RC operation—and subsequent to the activation of the wordline 245 for the destination row {C}, the RCL module 170 may trigger a traverse-columns command 215 to cause the CAL module 175 to traverse, and copy, each column 1 through 'n', across the source row and to move the read values to the appropriate bit across the target row. ('n' is the number of bits in each row, that is, the total number of columns.) The data is transferred from the first section 120 to the second section 120 via the GIO bus 190, as generally indicated by the data transfer path line 280 of FIG. 2C.

In the case of a fast RC operation, the RC module 170 triggers a concurrent, parallel transfer of all the block bits in the source row {A} to the corresponding bits in the destination row {B}, via the bitlines 183. Two different rows, sharing common bitlines, can transfer bitline values from one row to another. This occurs first by activating the source wordline, and then keeping the source wordline active while next activating the destination row wordline. When the common bitlines are also activated, the active bits are transferred via the internal electronics from the source row {A} to the destination row {B}.

In the case of a normal RC operation, the RC module 170 triggers a serial transfer (via the GIO bus 190) of all the block bits in the source row {A} to the corresponding bits in the destination row {C}. However, with either of the fast RC or normal RC, these bit transfers, with read source column selection 250 and appropriate write destination column selection 255, are accomplished via hardwired circuitry of the CAL module 175 of the banks 145.

In legacy DRAM technology, only one wordline may be active within a bank 145 at a time. The embodiments add suitable circuitry to enable two different wordlines 180 in two different rows 120 to be simultaneously active. As a result, a first memory row and a second memory row of the bank are activated concurrently by the DWLA module 173 and/or by the RCL module 170 during an overlapping time interval.

Figure 3:
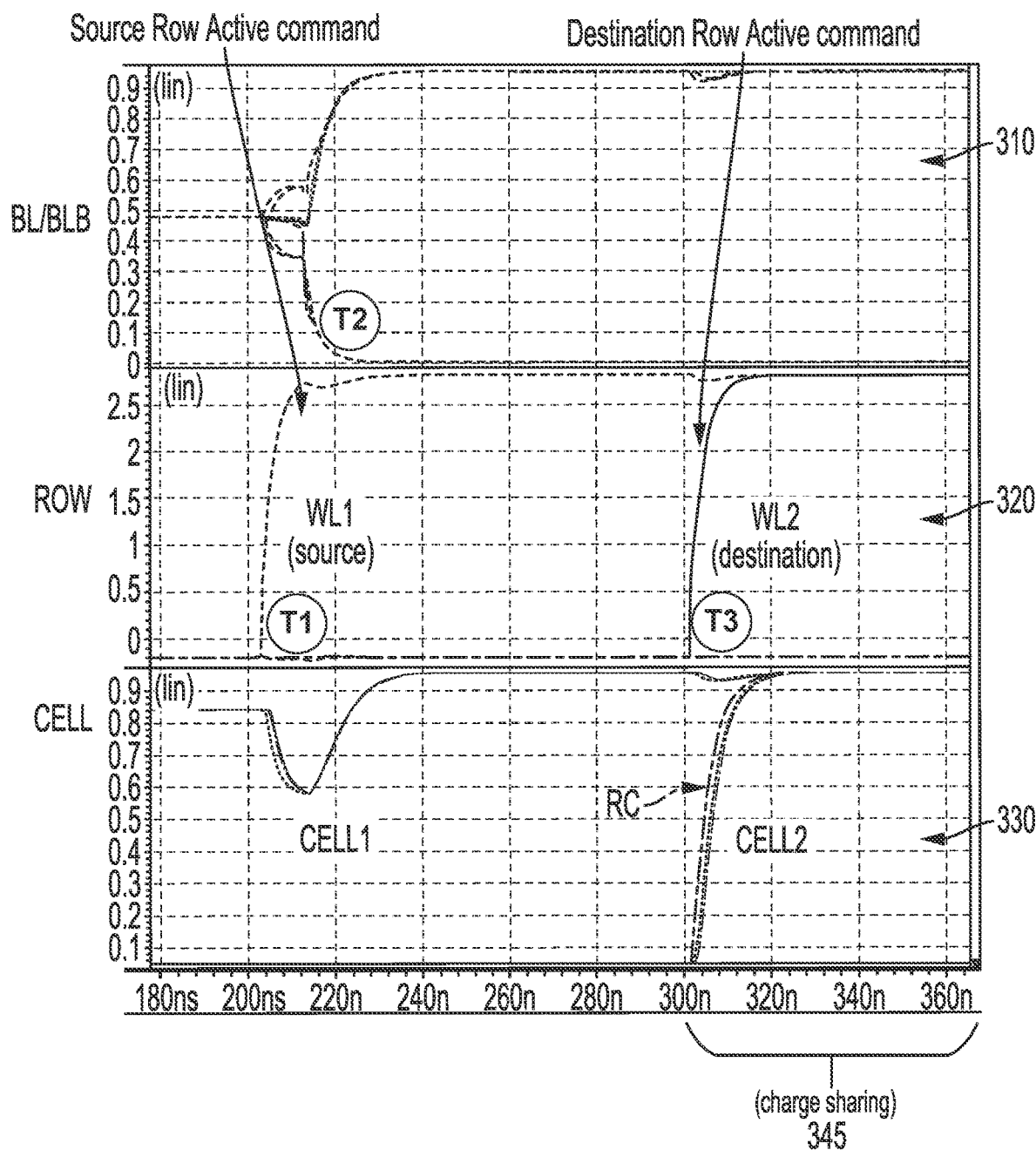
FIG. 3 illustrates exemplary signal timings for a fast row copy operation.

FIG. 3 illustrates three exemplary signal timings 300 for a fast RC operation. In the plots, the horizontal axes are timings in nanoseconds and the vertical axes are voltages. For example, in plot 320, the wordline 180 of the source row {A} is first activated at time (T1) by a source row ACT command. Almost instantly, and as seen in plotline 330, the cell voltages in the source row initially drop. But subsequently, as seen in plotline 310, at time (T2), the bitlines 183 for fast RC are energized. In plotline 330, the cells designated for copying in the source row {A} rise in voltage.

In plot 320, the wordline 180 of the destination row {B} is activated at time (T3) by a destination row ACT command. At time (T3) the appropriate bits of the destination wordline 180 {B} rise in voltage to match the linked voltages of the source wordline 180 {A}. That is, the time interval 345 when the wordlines 180 of both the source row {A} and the destination row {B} are active (e.g., from about 300 ns to 360) is when the bitlines of the designated memory locations have a shared charge level. The result is that the bits of the source row {A} are internally copied to the destination row {B}.

In some embodiments, two memory cells on a pair of respective wordlines 180 share a selected one of the sense amplifiers 185. When a first wordline is initially activated, and then subsequently the second wordline is activated, the bit values of the second wordline automatically activate to the same bit values as the first wordline. Due to the hardwired configuration of the banks 145, an exemplary sequence of events is:

(1) First wordline {A} on;
(2) Sense the charges of the cells in the first wordline {A} during a DES command cycle;
(3) Second wordline {B} on (first wordline remains active); and
(4) Cells of the second wordline automatically are set to the same charges of the cells of the first wordline via a selected one of the bitlines 183 of the selected sense amplifier 185.

Figure 4:
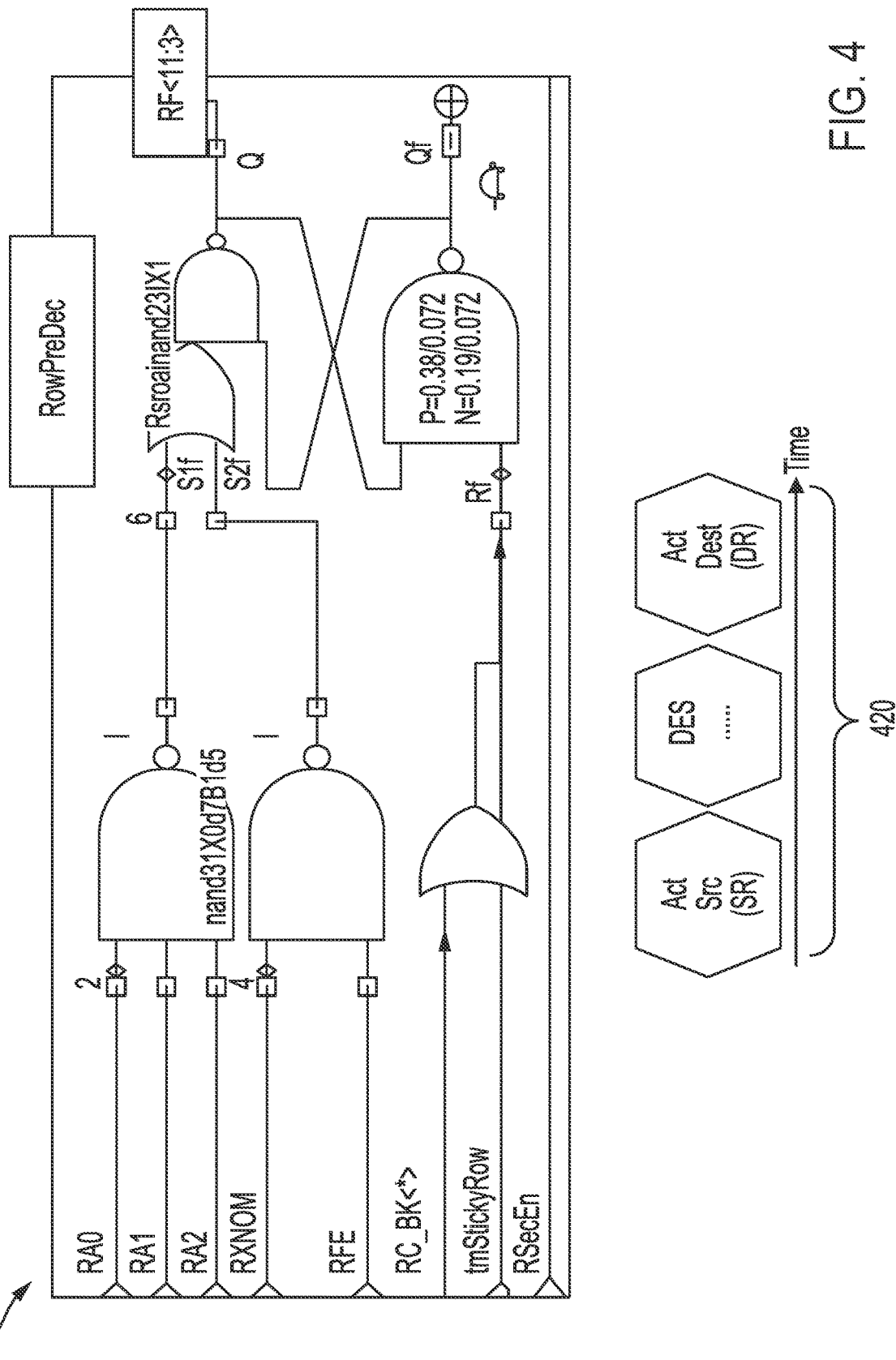
FIG. 4 illustrates an exemplary digital circuit which may be used to implement the fast row copy operation.

FIG. 4 illustrates an exemplary digital circuit 410 usable to support and implement the method described above. The digital circuit 410 is one example of a circuit that enables the source row address to remain active and the destination row address to be active simultaneously. By way of example, the circuit 410 may be part of the RCL module 170.

The detailed operations of the digital circuit 410 are beyond the scope of this document. However, the circuit timing diagram 420 shows the timing of events as allowed by circuit 410: First the source row is activated, then a DES command activates the bitlines, and then the destination row is activated while the source row remains activated as well.

Figure 5:
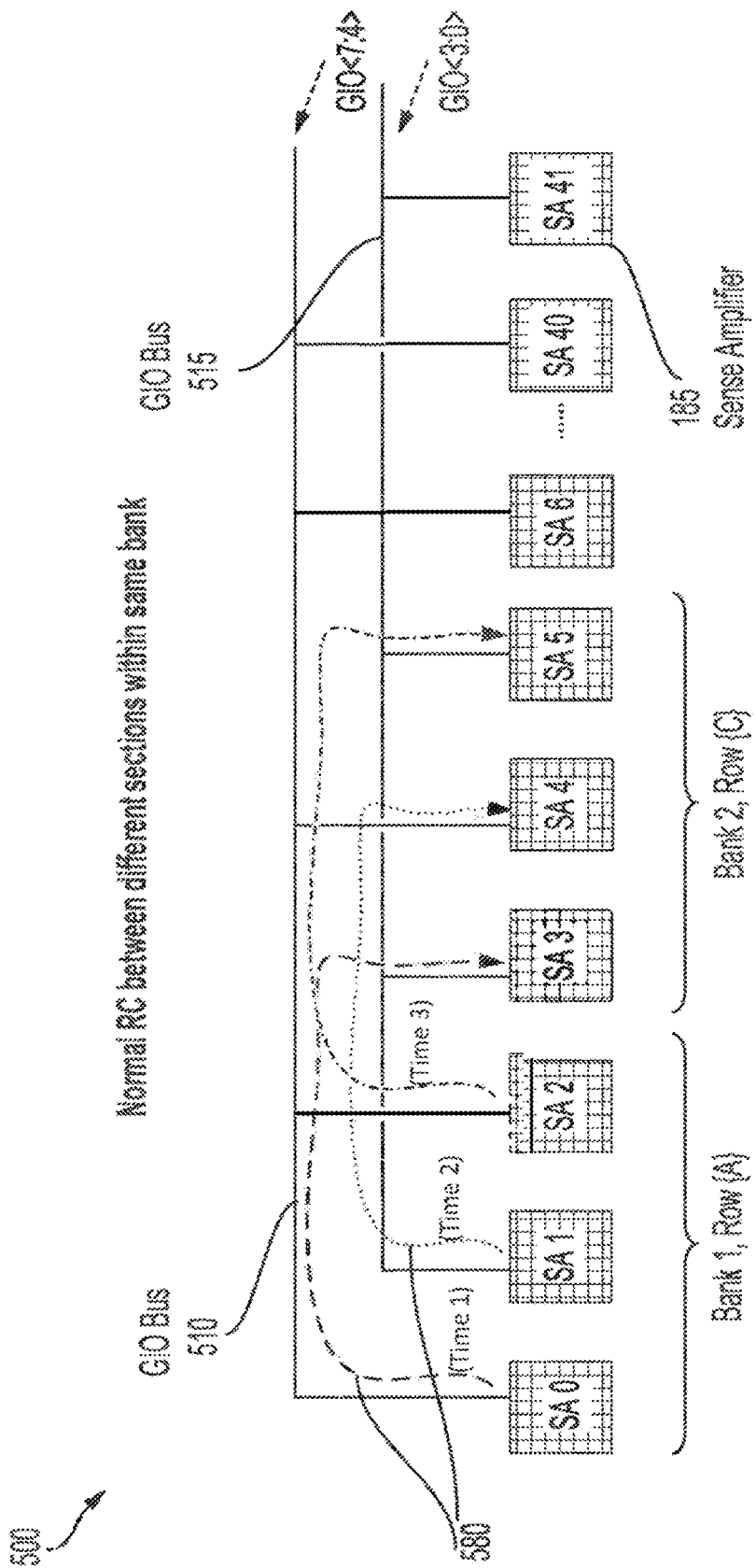
FIG. 5 illustrates a memory architecture and memory process which supports a normal row copy operation.

FIG. 5 illustrates a memory architecture and memory process 500 that supports a normal RC operation. The embodiments employ a normal RC operation when the source row {A} and the destination row {C} are part of common one of the banks 145 but are not part of a common section 120 (the source bits and destination bits do not share common bitlines 183).

However, the source address for row {A} and the destination address for row {C} share a common GIO bus 190. The sense amplifiers 185 associated with the first, source address for row {A} are therefore linked via the GIO bus 190 with the sense amplifiers 185 of the second, destination address for row {C}. FIG. 5 illustrates two GIO buses 190, specifically: a first GIO bus 510 which connects respective, corresponding, even-numbered sense amplifiers SA0, SA2, SA4, . . . , SA40, etc.; and a second GIO bus 515 which connects odd-numbered sense amplifiers SA1, SA3, . . . , SA41, etc.

For the normal RC operation, the NRC module 178 directs the other modules: the DWLA module 173, the RCL module 170, and the CAL module 175 in a suitable sequential order to direct the series of events of the normal RC operation. In the embodiments, the NRC module 178 may direct the DWLA module 173 and/or the RCL module 170 to activate the source wordline {A} and then subsequently the destination wordline {C} (while keeping the source wordline {A} active). The NRC module 178 may then direct the CAL module 175 to sequentially read each source row {A} column bit, transfer the data to the GIO bus 190, then write the data value ('0' or '1') to the appropriate column bit in the destination row {C}.

Data, via data transfer path lines 580, is transferred sequentially over the GIO bus 190 at sequential times (T1), (T2), (T3), etc. To execute this operation, one or more hardware-level operations may be implemented by one or more of the DWLA modules 173, the RCL module 170, the CAL module 175, and/or the NRC module 178.

For example, an Add Row Copy function may be added to the write-enable logic of the various modules to enable indication that the destination row {C} is to be enabled along with the source row {A}. The Add Row Copy function may include suitable parameters for alignment of the data sections of destination/source rows {A}/{C}. Similarly, a Sticky Row Logic function may be added to the read-enable logic of the various modules to ensure that after the source row {A} and destination row {C} are activated, any other subsequent row addresses will be ignored.

The distribution of various RC functions and activities among distinctive modules is exemplary only (i.e., for purposes of explanation). In practice, elements of the required logic and control circuitry may be packaged, organized, or distributed in different ways among different functional modules, or have different, fewer, or additional functional boundaries and/or physical structural boundaries on the integrated circuit(s) than those described herein.

Figure 6:
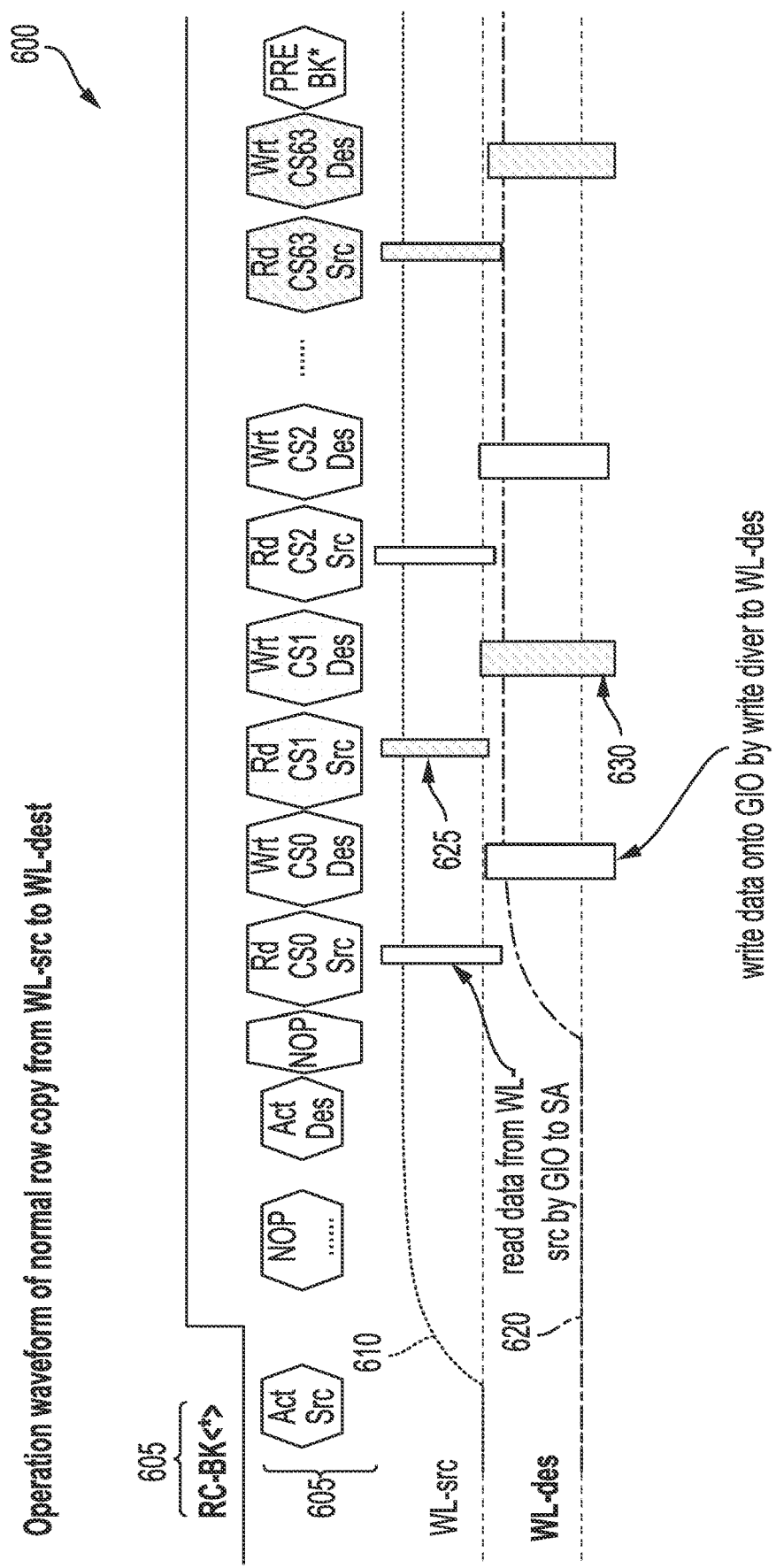
FIG. 6 illustrates elements of a method 600 for a normal row copy operation.

FIG. 6 illustrates elements of a method 600 for a normal RC operation, including an exemplary command sequence 605. Also included are activation time plots 610, 620 for the activation of the source and destination wordlines, and activation states 625, 630 for the read and write sense amplifiers 185, respectively.

As per FIGS. 1B, 2C, and 5 above, both the source row {A} and the destination row {C} share the same GIO bus 190 within a selected one of the banks 145. Therefore, data is copied from the source row {A} to the destination row {C} by first issuing suitable read enable source commands WL1 to WL2 by Rd-src→Wr-dest.

In exemplary command sequence 605, an <Act Src> (activate source) command initiates the activation of the source row {A}. This may be followed by a <NOP> (no operation) command for timing purposes. Subsequently, an <Act Des> (activate destination) command may initiate activation of the destination row {C}, while the source row {A} remains active as well. A <NOP> command may be issued for timing purposes.

Once both the source address for row {A} and the destination address for row {C} have active wordlines, a series of commands read commands and write commands <RD CSn Src>, <Wrt CSn Des> are issued to: sequentially access data 625 from the source address for row {A} via successive bitlines 183; transfer the data via the GIO buses 510, 515; and sequentially write the destination data 630 to the destination address for row {C}.

By way of example, in the commands <RD CSn Src>, <Wrt CSn Des>: RD="read"; Wrt="write"; CS="column select" (to select bitlines 183, or equivalently to select sense amplifiers 185); 'n'=0, . . . , [highest numbered sense amplifier]; Src="source", and Des="destination." For example, the command <Re CS2 Src> is a command to read the bit value ('0' or '1', as may be the case) in the source row {A} for the second bitline in that row. The command <Wrt CS2 Des> is a command to write the bit value just read to the destination row {C} for the second bitline in that row.

The embodiments provide for various operational modes and status modes of the DRAM module 100 with respect to the RC operations disclosed herein. FIG. 7 presents Table 1 which lists some exemplary modes and statuses.

As shown in FIGS. 1B, 2B, 2C, and Table 1, each of the memory banks 145 (or bank group, depending on the flexibility level requirement), will have a memory register (MR) with a set 770 of RC register bits. The RC enable (RCen) bit 760 has two possible values 775 (i.e., '0' or '1'). A client program, which may include a device driver for the DRAM module 100, may set RCen to '1' or '0' to enter or exit RC copy mode, respectively. The RC mode is bank or bank group specific, meaning that only one of the memory banks 145, or bank group, with its RCen bit set equal to '1' will enter RC mode. Normal operations of the other banks or bank groups are not impacted.

The RC operation can only be executed when a bank is idle. User reads/writes/refreshes are not allowed on a bank in row copy mode. (Other well-known commands, which do not "touch" or change the memory array, such as MRR/MRW/MPC, are allowed.)

Two or more bits are allocated for RC status (RCstatus) 755. RCstatus 995 will indicate what type of RC is ongoing and whether the last row copy is done or not. Table 1 illustrates just two exemplary bits, but more bits can be added to provide more information. RCstatus="00" is the default status when RCen is just set to '1'.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein, and the scope of the appended claims.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present disclosure can be implemented by software, firmware, hardware (or hardware represented by software such, as for example, Verilog or hardware description language instructions), or a combination thereof. After reading this description, it will become apparent to a person skilled in the relevant art how to implement the disclosure using other memory systems or architectures. The simulation, synthesis and/or manufacture of the various embodiments of this disclosure can be accomplished, in part, through use of computer readable code, including general programming languages (such as C or C++), hardware description languages (HDL) including Verilog HDL, VHDL, Altera HDL (AHDL), or other programming and/or computer automated design (CAD) tools.

This computer readable code can be disposed in any known computer usable medium including semiconductor, magnetic disk, optical disk (such as CD-ROM, DVD-ROM) and as a computer data signal embodied in a tangible computer usable (e.g., readable) transmission medium (including tangible digital, optical, or analog-based medium). Further, the computer readable code may be transmitted over communication networks, both wired and wireless, including the Internet and intranets. Further, the computer readable code may be transmitted via modulated carrier waves, including but not limited to radio waves, microwaves, and light emissions, where a distinctive pattern of modulation imposed on the carrier wave(s) corresponds to and conveys the computer readable code.

The Detailed Description section, and not the Abstract section, is intended to be used to interpret the claims. The Abstract may set forth one or more but not all exemplary embodiments of the present disclosure as contemplated by the inventor(s), and thus, is not intended to limit the present disclosure and the appended claims in any way.

What is claimed is:

1. A system comprising:
    at least one bank of memory comprising an array of dynamic random access memory (DRAM) devices, each bank of the at least one bank of memory comprising a dual wordline activation (DWLA) module configured to: (i) activate a first wordline of a first memory row of a first section of the at least one bank of memory; and (ii) activate a second wordline of a second memory row of
    the first section of the at least one bank of memory or a second section of the at least one bank of memory;
    a first array of sense amplifiers serving a column of DRAM devices from the array of DRAM devices;
    an input/output (I/O) bus, associated with the at least one bank of memory, connecting ones of sense amplifies from the first array of sense amplifiers; and
    a row copy module, the row copy module configured to initiate copying of data from the first memory row, served by the first array of sense amplifiers, to the second memory row, served by the first array of sense amplifiers or served by a second array of sense amplifiers coupled, via the I/O bus, to the first array of sense amplifiers, in connection with
    the DWLA module activating both the first wordline and the second wordline,
    a read operation performed on the first memory row, and
    copying data from the first memory row to the second memory row via a plurality of bitlines, the plurality of bitlines being connected to
        the first array of sense amplifiers or
        the first array of sense amplifiers and the second array of amplifiers.

2. The system of claim 1, wherein the DWLA module is further configured to:
    receive an indication that a data is to be copied from the first memory row to the second memory row, and
    upon receiving the indication, activate the first wordline and the second wordline.

3. The system of claim 1, wherein the DWLA module is further configured to copy a data from the first memory row to the second memory row without an intermediate transfer of the data to either of a processor external to the DRAM or a controller external to the DRAM.

4. The system of claim 1, wherein:
    the DWLA module is further configured to identify when the first wordline and the second wordline are part of a same first section of the at least one bank of memory and when the first wordline and the second wordline are part of a respective different first section of the at least one bank of memory and second section of the at least one bank of memory.

5. The system of claim 4, wherein:
    upon determining that the first wordline and the second wordline are part of a same section of the at least one bank of memory, the DWLA module is further configured to activate a set of common bitlines of the plurality of bitlines for the direct transfer of the data from the first memory row to the second memory row.

6. The system of claim 4, wherein:
    upon determining that the first wordline and the second wordline are part of different respective first and second sections of the at least one bank of memory, the at least one bank of memory being configured to transfer of the data from the first memory row to the second memory row via the input/output bus of the at least one bank of memory.

7. The system of claim 6, wherein:
    the at least one bank of memory is further configured to transfer of the data from the first memory row to the second memory row via sequential transfer of bits from the first memory row to the second memory row.

8. The system of claim 1, further comprising a row copy mode register configured to enable a user of the row copy operation to enable or disable a row copy mode.

9. The system of claim 8, wherein the row copy mode register is further configured to indicate a row copy operational status.

10. A method for using a system comprising an array of dynamic random access memory (DRAM), configured with at least one bank of memory, comprising a dual wordline activation (DWLA) module, the method comprising:
    receiving an indication that a data is to be copied from a first memory row to a second memory row via the DWLA module, wherein upon receiving the indication:
        activating the first memory row in a first section of a first bank of the at least one bank of memory of the DRAM; and
        activating the second memory row of one of the first section of the at least one bank of memory or a second section of the at least one bank of memory simultaneously; wherein:
    the first memory row and the second memory row of the at least one bank of memory are activated concurrently during a concurrent time interval such that via a digital circuit, (i) the first memory row is activated (ii) a plurality of bitlines associated with first memory row and the second memory row is activated and (iii) the second row is activated while the first row remains activated;

reading the first memory row and copying data from the first memory row into the second memory row via a plurality of sense amplifiers coupled to a plurality of bitlines serving memories from the first memory row and the second memory row, the plurality of sense amplifiers commonly serving the first memory row and the second memory row or separately serving the first memory row and the second memory row and mutually coupled to an input/output bus of the at least one bank of memory.

11. The method of claim 10, further comprising activating the second memory row subsequent to the activation of the first memory row.

12. The method of claim 10, wherein the copying occurs during the concurrent time interval.

13. The method of claim 12, wherein the copying of data from the first memory row to the second memory row occurs without an intermediate transfer of the data to either of a processor external to the DRAM or a controller external to the DRAM.

14. The method of claim 12, further comprising:
identifying when the first wordline and the second wordline are part of a same first section of the at least one bank of memory and when the first wordline and the second wordline are part of a different respective first section of the at least one bank of memory and second section of the at least one bank of memory.

15. The method of claim 14, further comprising:
upon determining that the first wordline and the second wordline are part of a same section of the at least one bank of memory, activating a set of common bitlines of the plurality of bitlines for the direct transfer of the data from the first memory row to the second memory row.

16. The method of claim 14, further comprising:
upon determining that the first wordline and the second wordline are part of different respective first and second sections of the at least one bank of memory, the copying of data occurs via transferring the data from the first memory row to the second memory row via the input/output bus of the at least one bank of memory.

17. The method of claim 16,
wherein the transferring the data from the first memory row to the second memory row occurs via sequential transfer of bits from the first memory row to the second memory row.

18. The method of claim 12, further comprising indicating via a register of the system, a status of the copying of the data from the first memory row to the second memory row.

19. The method of claim 10, wherein activating either of the first memory row or the second memory row comprises activating a respective first wordline or a respective second wordline.

20. A non-transitory computer readable medium configured to store instructions, executable by one or more processing modules for causing a DRAM system, having at least one bank of DRAM memories, each bank comprising an array of DRAM devices, to perform the following:
identify memory locations from which to copy data from a first memory row to a second memory row in connection with activating the first memory row in a first section of a first bank of memory of the DRAM system and activating the second memory row of one of the first section of the at least one bank or a second section of the at least one bank of memory simultaneously;
wherein:
the first memory row and the second memory row of the at least one bank of memory are activated concurrently during a concurrent time interval such that via a digital circuit,
the first memory row is activated
a plurality of bitlines associated with first memory row and the second memory row is activated and the second row is activated while the first row remains activated; and
copy of data from the first memory row, served by a first array of sense amplifiers, to the second memory row, served by the first array of sense amplifiers or served by a second array of sense amplifiers coupled, via an input/output bus, to the first array of sense amplifiers.

* * * * *